US010929663B2

(12) United States Patent
Guan et al.

(10) Patent No.: US 10,929,663 B2
(45) Date of Patent: *Feb. 23, 2021

(54) PONDING WATER DETECTION ON SATELLITE IMAGERY

(71) Applicant: THE CLIMATE CORPORATION, San Francisco, CA (US)

(72) Inventors: Wei Guan, Fremont, CA (US); Pramithus Khadka, St. Louis, MO (US)

(73) Assignee: THE CLIMATE CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,364

(22) Filed: Oct. 8, 2019

(65) Prior Publication Data
US 2020/0050826 A1  Feb. 13, 2020

Related U.S. Application Data

(63) Continuation of application No. 16/038,006, filed on Jul. 17, 2018, now Pat. No. 10,467,472, which is a
(Continued)

(51) Int. Cl.
*H04N 7/18* (2006.01)
*G06K 9/00* (2006.01)
(52) U.S. Cl.
CPC ....... *G06K 9/0063* (2013.01); *G06K 9/00657* (2013.01); *G06K 2009/00644* (2013.01)
(58) Field of Classification Search
CPC ............. G06K 9/0063; G06K 9/00657; G06K 2009/00644
See application file for complete search history.

(56) References Cited

U.S. PATENT DOCUMENTS 10,025,983 B2    7/2018   Guan et al.
2006/0020408 A1  1/2006   Cole et al.
(Continued)

FOREIGN PATENT DOCUMENTS

WO    WO 2008/033127 A1    4/2008

OTHER PUBLICATIONS

The International Bureau of WIPO, "International Preliminary Reoprt on Patentability" in application No. PCT/US2016/051492, dated Mar. 27, 2018, 6 pages.
(Continued)

*Primary Examiner* — Richard T Torrente
(74) *Attorney, Agent, or Firm* — Hickman Palermo Becker Bingham LLP; Malgorzata A. Kulczycka

(57) ABSTRACT

A system for identifying ponding water located on a field from image data is described. In an approach, an image of an agricultural field is analyzed using a classifier that has been trained based on the spectral bands of labeled image pixels to identify a probability for each pixel within the image that the pixel corresponds to water. A flow simulation is performed to determine regions of the field that are likely to pool water after rainfall based on precipitation data, elevation data, and soil property data of the field. A graph of vertices representing the pixels and edges representing connections between neighboring pixels is generated. The probability of each pixel within the graph being ponding water is set based on the probability pixel being water, the likelihood that water will pool in the area represented by the pixel, the probability of neighboring pixels being ponding water, and a cropland mask that identifies which pixels correspond to cropland. A class for each pixel is then determined that maximizes the joint probability over the graph.

20 Claims, 7 Drawing Sheets

Related U.S. Application Data continuation of application No. 14/860,247, filed on Sep. 21, 2015, now Pat. No. 10,025,983.

(56) References Cited

U.S. PATENT DOCUMENTS

| | | | |
|---|---|---|---|
| 2010/0104191 | A1 | 4/2010 | McGwire |
| 2012/0070071 | A1* | 3/2012 | Rankin .............. G06K 9/00805 |
| | | | 382/154 |
| 2013/0110399 | A1* | 5/2013 | Moss ..................... G01W 1/10 |
| | | | 702/3 |
| 2015/0254800 | A1 | 9/2015 | Johnson |
| 2017/0083747 | A1 | 3/2017 | Guan et al. |
| 2019/0019008 | A1 | 1/2019 | Guan |

OTHER PUBLICATIONS

Posner et al. "A Method for the Assimilation of Standing Water Estimates From Satellite Earth Observations into the Flash Flood Guidance System Soil Water Model", dated Jul. 29, 2013, 37 pages.
International Searching Authority, "Search Report" in application No. PCT/US2016051492, dated Nov. 11, 2016, 12 pages.
Current Claims in application No. PCT/US2016051492, dated Nov. 2016, 3 pages.
Current Claims in application No. PCT/US2016/051492, dated Mar. 2018, 3 pages.
Canada Patent Office, "Search Report" in application No. 3,029,179, dated Dec. 19, 2019, 5 pages. Canada Claims in application No. 3,029,179, dated Dec. 2019.
Guan, U.S. Appl. No. 16/038,006, filed Jul. 17, 2018, Notice of Allowance dated Jul. 8, 2019.
Guan, U.S. Appl. No. 16/038,006, filed Jul. 17, 2018, Office Action dated Feb. 6, 2019.
Guan, U.S. Appl. No. 16/038,006, filed Jul. 17, 2018, Interview Summary dated Mar. 12, 2019.
Guan, U.S. Appl. No. 14/860,247, filed Sep. 21, 2015, Final Office Action dated Aug. 31, 2017.
Guan, U.S. Appl. No. 14/860,247, filed Sep. 21, 2015, Office Action dated Dec. 8, 2017.
Guan, U.S. Appl. No. 14/860,247, filed Sep. 21, 2015, Office Action dated May 22, 2017.
Guan, U.S. Appl. No. 14/860,247, filed Sep. 21, 2015, Interview Summary dated Oct. 12, 2017.
Guan, U.S. Appl. No. 14/860,247, filed Sep. 21, 2015, Corrected Notice of Allowability dated Jun. 18, 2018.
Guan, U.S. Appl. No. 14/860,247, filed Sep. 12, 2015, Notice of Allowance dated Mar. 26, 2018.
Argentina Office Action in application No. 201620133 AR, dated Feb. 26, 2020, 1 page.
Argentina Claims in application No. 20160102875, dated Feb. 2020, 3 pages.
Brazil Patent Office, "Office Action" in application No. BR112018005607-3, dated Aug. 25, 2020, 6 pages.
Brazil Claims in application No. BR112018005607-3, dated Aug. 2020, 4 pages.
Australian Patent Office, "Search Report" in application No. 2016326330 dated Jul. 8, 2020, 3 pages.
Australian Claims in application No. 2016326330, dated Jul. 2020, 6 pages.

* cited by examiner

Fig. 2
(a)
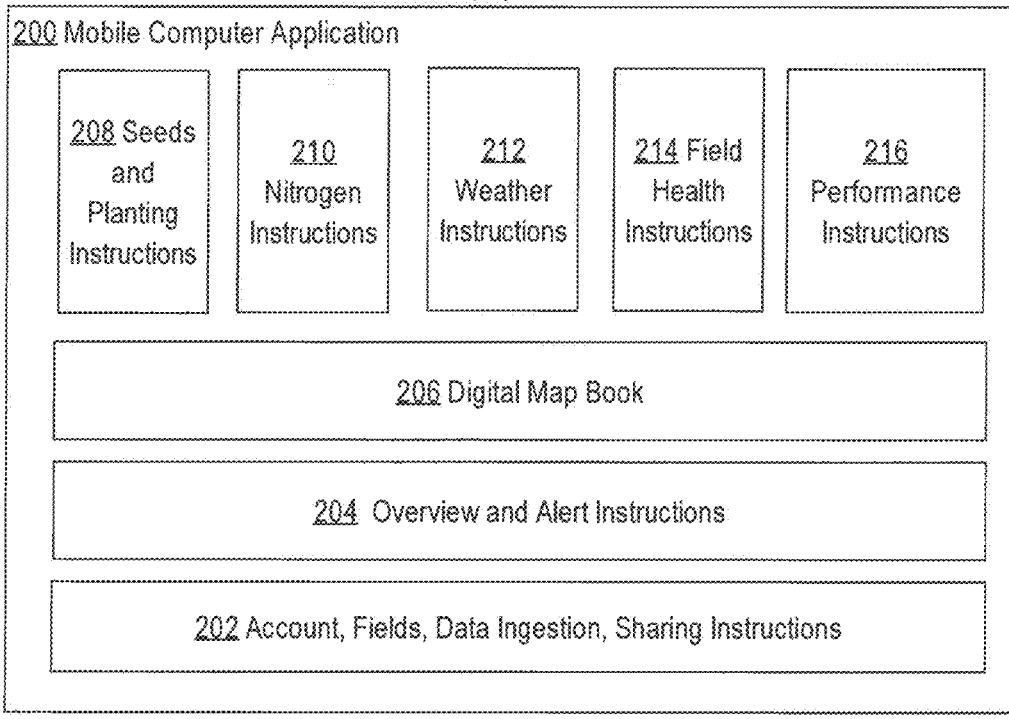
(b)
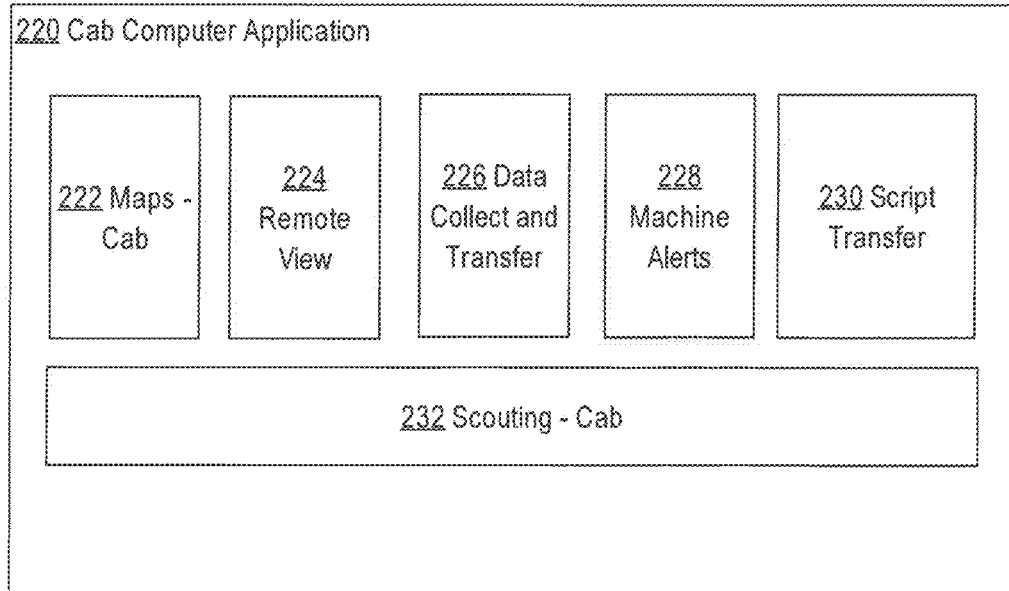

PONDING WATER DETECTION ON SATELLITE IMAGERY

BENEFIT CLAIM

This application claims the benefit under 35 U.S.C. § 120 as a Continuation of application Ser. No. 16/038,006, filed Jul. 17, 2018, which is a continuation of application Ser. No. 14/860,247, filed Sep. 21, 2015, U.S. Pat. No. 10,025,983, issued on Jul. 17, 2018 the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to detecting ponding water within agricultural fields using programmed computer systems to analyze digital images. More specifically, the present disclosure relates to detecting ponding water within agricultural fields by analyzing satellite imagery of said agricultural fields.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Ponding water (also referred to as standing water, stagnated water, or pooled water) is typically an unwanted body of water that temporarily pools on a location, such as a field or roof, after rainfall. For example, after heavy rain, certain areas of a farmer's field based on geographical properties such as elevation and properties of the soil may experience a pooling of water. Although ponding water typically dissipates after some time, either through evaporation or absorption into the soil, in the meantime ponding water can be extremely detrimental to the growth of certain crops. For example, the ponding water may be pooled on top of the crops and cause the crops to become overwatered. Newly emerged seedlings, or crops such as turf grass that are short even at maturity, can become inundated and oxygen starved, resulting in severe damage or total loss under the ponded area. This is especially dangerous during early growing seasons when overwatering can cause a drastic decrease in crop yield come harvest.

In order to detect ponding water, farmers have typically had to physically traverse the fields after rainfall to determine if any ponding water has formed that could potentially harm the crops. If such dangerous accumulations of water are located, the farmers drain the area to keep the crops healthy and prevent losses in crop yield. However, modern farms can span extremely large areas and it may not be practical to physically visit all the potential areas where ponding water might appear. As a result, a field of research has grown around techniques to automatically detect ponding water from multispectral images captured by satellite. These spectral approaches typically rely on the fact that water strongly absorbs incoming radiation in the near to mid-infrared wavelengths. Thus, rather than the farmer physically going out to inspect the fields, satellite imagery of the agricultural fields can be taken on a periodic basis and analyzed to determine areas where standing water has accumulated.

Many standing water detection techniques have been developed in recent years. These techniques include simple thresholding using infrared bands, combinations of two or more bands or indices, such as the normalized difference vegetation index (NDVI) and the normalized difference water index (NDWI), and the inclusion of auxiliary variables related to relief and topography for water detection purpose. Existing techniques tend to rely on large-scale water detection, such as permanent water or flooding events with Landsat images. However, such techniques translate poorly to detecting within-field ponding water.

There are many challenges to differentiating water signals from other land cover signals in remotely sensed data, such as satellite imagery data. Water quality and depth affect the spectral response particularly in the visible portion of the spectrum. In fact, a great deal of research has been devoted to techniques for monitoring water quality and bathymetry using remote sensing data. Other factors which create challenges for mapping standing water are related to the mixed spectral response of pixels covered partially by water (also called mixed pixels or "mixels"). Under certain resolutions, such as in 5 m resolution images, the pixels can be mixed of multiple end-members such as soil, residue, vegetation, water as in furrow irrigation or in flooded wetlands where vegetation is not completely submerged. Another issue comes from the fact that most high-resolution remote sensing imagery is not atmospherically corrected, so that the water content or aerosol depth impacts the sensed signals. Given these issues, within-field ponding water detection becomes an extremely challenging problem.

SUMMARY OF THE DISCLOSURE

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

DETAILED DESCRIPTION

Figure 1:
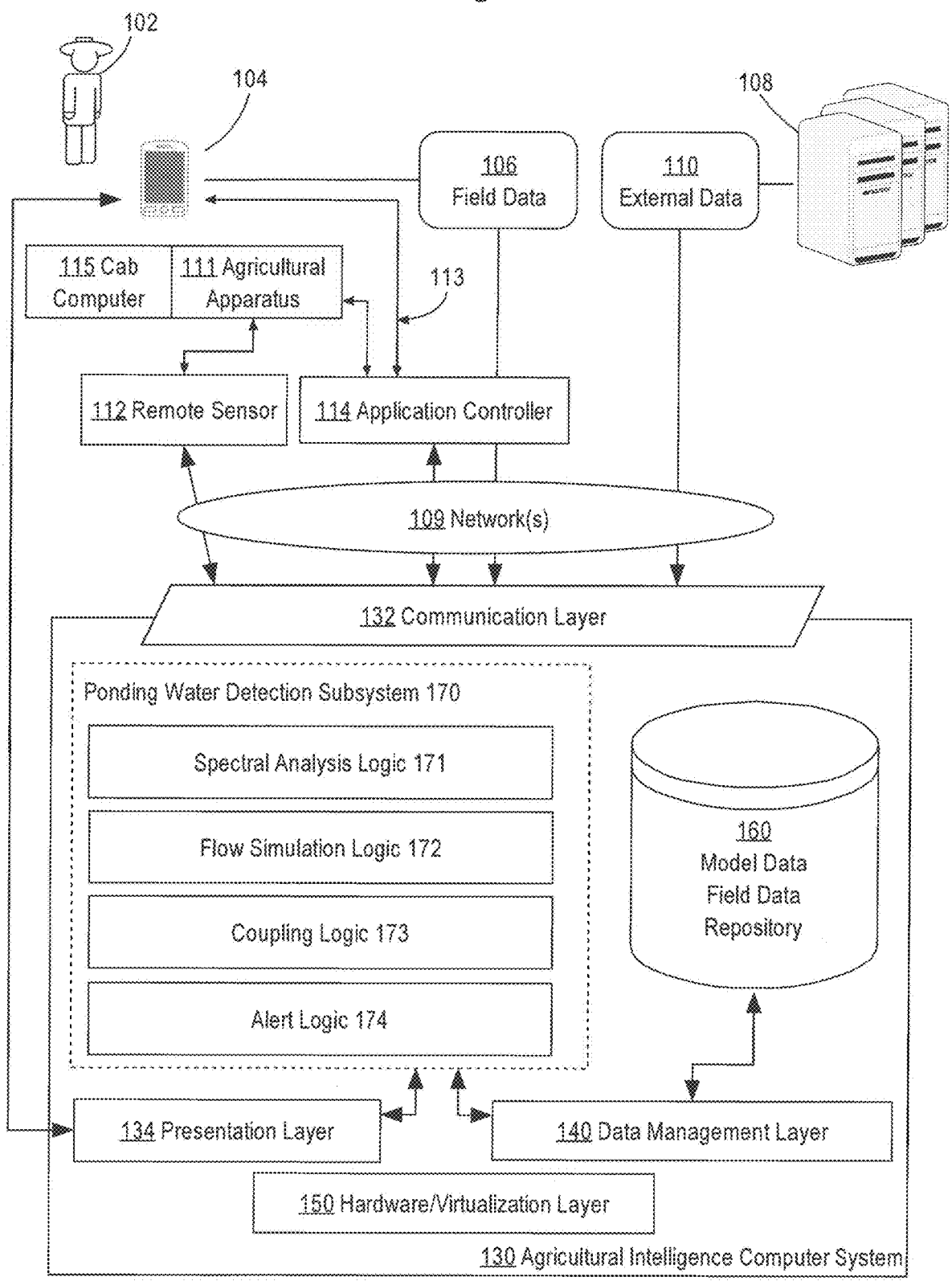
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:
  1.0 General Overview
  2.0 Example Agricultural Intelligence Computer System
    2.1 Structural Overview
    2.2 Application Program Overview
    2.3 Data Ingest to the Computer System
    2.4 Process Overview—Agronomic Model Training
    2.5 Ponding Water Detection Subsystem
    2.6 Implementation Example—Hardware Overview
  3.0 Example System Inputs
    3.1 Remote Sensing Data
    3.2 Precipitation Data
    3.3 Elevation Data
    3.4 Soil Property Data
    3.5 Cropland Data
  4.0 Analysis Triggers
  5.0 Spectral Analysis
    5.1 Preparing Ground Truth Data
    5.2 Training and Using the Classifier
  6.0 Flow Simulation
  7.0 Coupling Analysis
  8.0 Alert Examples
    8.1 Guided Tour of Detected Problem Areas
    8.2 Weather Index Insurance Applications
  9.0 Alternative Applications
  10.0 Extensions and Alternatives
  11.0 Additional Disclosure 1.0 General Overview Aspects of this disclosure focus on the problem of detecting standing water within agricultural fields, particularly in early growing seasons when crops are more sensitive to being overwatered. In one computer-implemented approach, a programmed model is developed for detecting standing water, the input of which is electronically stored digital imagery taken of the agricultural field and digital data representing properties of the field such as elevation data, precipitation data, and soil property data. In some cases, a digital cropland mask, which identifies which pixels of the imagery correspond to agricultural fields/cropland, is used as a filter during the analysis.

In an embodiment, a model for detecting standing water is supplied with inputs related to the agricultural field(s) such as satellite image data, precipitation data, elevation data, soil property, and a cropland field mask. Conceptually, the model can be divided into four components which represent the logic employed by the computing system to detect ponding water. However, the techniques described herein may be implemented in embodiments which organize functionally equivalent logic in ways other than the exact four components discussed.

The spectral analysis logic analyzes spectral bands from a satellite image of the field and provides a water probability map. The water probability map indicates, for individual pixels of the satellite image, what the probability is that the pixel represents water. In some embodiments, the spectral analysis logic implements a classifier that has been trained on labeled imagery to generate the probability. For example, the spectral analysis logic may employ a logistic regression model that uses the spectral bands of each pixel as features.

The flow simulation logic uses the measured level of precipitation from the previous rainfall, along with a geographic elevation map of the field and absorption properties of the soil within the field, to estimate regions where rainwater is likely to pool. For example, an iterative algorithm can be used to estimate from a starting position of water from the rainfall on the field, where the water is likely to flow and in what quantities based on the elevation of the region and absorption rate of the soil. After a number of iterations, areas in the simulation which still contain water are marked as potential ponding areas.

The coupling logic combines the results of the spectral analysis logic with the results of the flow simulation logic. The coupling logic works under the assumption that a pixel which accurately represents water has a greater likelihood to be surrounded by other water pixels, rather than by pixels representing dry land. As a result, a pixel which has a high probability of being a water pixel also increases the likelihood that neighboring pixels also represent water. In addition, the model assumes that pixels with a high probability of being water (as determined by the spectral analysis logic) and are in an area in which water is likely to pool (as determined by the flow simulation logic) has a higher probability of representing ponding water.

The coupling logic formalizes the aforementioned concepts into a concrete workable model. For example, the satellite image could be viewed as a graph, where each node represents a pixel and is connected to the neighboring pixels with an edge. The probability that each pixel represents water is based on a weighted combination of value of the water probability map for the pixel and the likelihood of water pooling in the area represented by the pixel based on the flow simulation. For example, if the pixel has both a high probability of being water and is in a position where flooding is likely to occur, the probability of that pixel being ponding water is strengthened. However, if the two sub-models disagree (or agree the pixel represents dry-land), the probability of the pixel representing ponding water is decreased accordingly.

Furthermore, the probability of a pixel being ponding water is not considered in a vacuum, instead the probability of the neighboring pixels being ponding water is also taken into consideration. For example, bolstering the probability of representing ponding water if the neighbors are likely to be water pixels and weakening the probability if the neighbors are likely to be dry-land pixels. Thus, the model estimates the class (water or dry-land) for each pixel that maximizes the joint probability over the graph. In some embodiments, the coupling logic utilizes a Markov Random Field (MRF) to model the coupling between the pixels. Furthermore, in some embodiments, the goal is to detect ponding water only on agricultural fields/cropland. As a result, a cropland field mask is utilized to filter out pixels which do not represent cropland, effectively preventing non-cropland pixels from being classified as ponding water.

The alert logic uses the result of the coupling logic (the per-pixel classification of water or dry-land) to generate an alert (e.g. emails, text messages, and so forth) that is sent to a device of the farmer or other agricultural agent that warns of potentially dangerous ponding water on the fields and the specific location(s) to investigate. In some embodiments, in addition to the locations, the alert logic also computes an optimal route for the farmer to take which visits all the discovered problem areas in the field(s).

Thus, the techniques described herein provide a benefit in that techniques pin-point the areas in the agricultural fields likely to contain ponding water so that the farmer can more efficiently locate and drain the areas of ponding water. Since ponding water can drastically decrease crop yield, the sooner the farmer can locate and drain the ponding water, the greater chance that crop yield can be preserved even in cases of severe flooding.

Many of the examples presented herein assume that the satellite imagery is capable of detecting various bands, such as the blue, green, red, red edge, and near infrared (NIR) bands at various resolutions. As a concrete example, the satellite imagery used as input to the model may be RAPID-EYE satellite image data, commercially available from a variety of satellite service providers, such as the Satellite Imaging Corporation headquartered in Tomball, Tex. However, the techniques described herein are not limited to any particular type of imagery. For example, some embodiments may use imagery taken from a plane flying over the field, rather than satellite imagery.

Other features and aspect of the disclosure will become apparent in the drawings, description, and claims.

2.0 Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agriculutral fields. The field manager computing device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source), (f) pesticide data (for example, pesticide, herbicide, fungicide, other substance or mixture of substances intended for use as a plant regulator, defoliant, or desiccant), (g) irrigation data (for example, application date, amount, source), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is an example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including to send requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user 102 may be prompted via one or more user interfaces on the user device (served by the agricultural intelligence computer system) to input such information. In an example embodiment, the user 102 may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user 102 may specify identification data by accessing field identification data (provided as shape files or in a similar format) from the U.S. Department of Agriculture Farm Service Agency or other source via the user device and providing such field identification data to the agricultural intelligence computer system.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
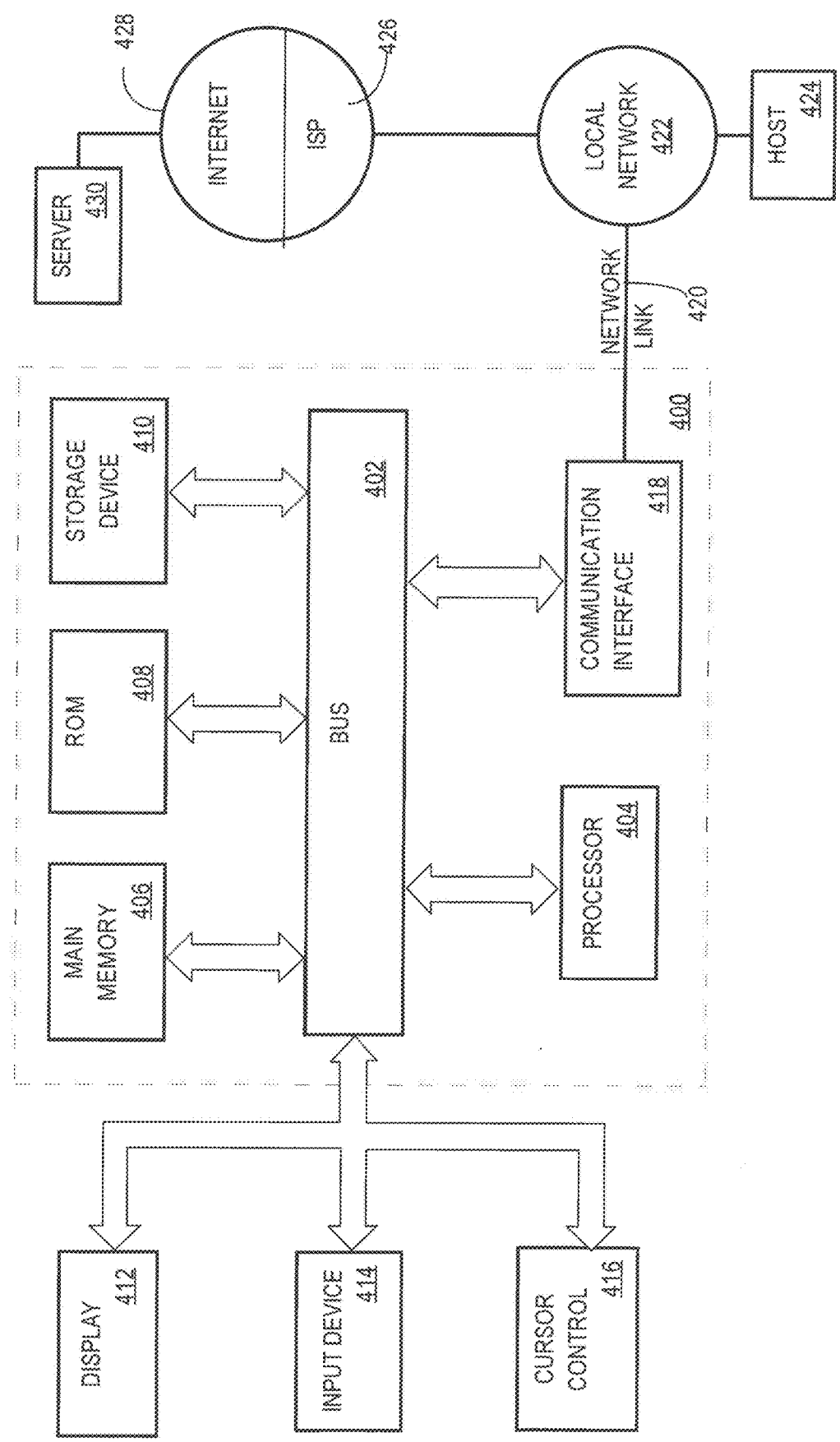
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system 130 independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide server-side functionality, via the network 109 to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, external APIs that push data to the mobile application, or instructions that call APIs of external systems to pull data into the mobile application.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 and programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, nitrogen instructions 210 are programmed to provide tools to inform nitrogen decisions by visualizing the availability of nitrogen to crops and to create variable rate (VR) fertility scripts. This enables growers to maximize yield or return on investment through optimized nitrogen application during the season. Example programmed functions include displaying images such as SSURGO images to enable drawing of application zones; upload of existing grower-defined zones; providing an application graph to enable tuning nitrogen applications across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of manure application that were used. Nitrogen instructions 210 also may be programmed to generate and cause displaying a nitrogen graph, once a program is applied to a field, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the NITROGEN ADVISOR, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-of) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers; such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or booni position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example; the apparatus disclosed in U.S. Pat. Nos. 8,767,194 and 8,712,148 may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data 1 for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
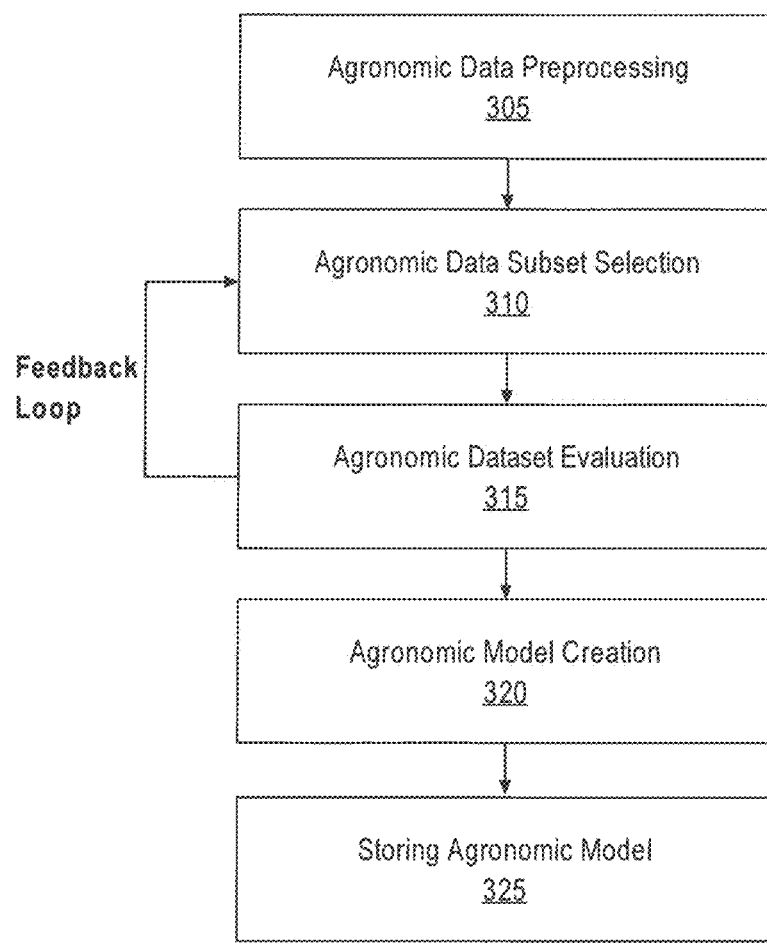
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more external data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more external data resources. The field data received from one or more external data resources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Ponding Water Detection Subsystem

In an embodiment, the agricultural intelligence computer system 130, among other components, includes a ponding water detection subsystem 170. The ponding water detection subsystem 170 collects information related to a field from the model data and field data repository 160 and/or external data 110 and determines whether and where ponding water has accumulated on the field.

In an embodiment, the ponding water detection subsystem 170 includes spectral analysis logic 171, flow simulation logic 172, coupling logic 173, and alert logic 174.

The spectral analysis logic 171 analyzes spectral bands from a satellite image of the field and provides a water probability map. The water probability map indicates, for individual pixels of the satellite image, what the probability is that the pixel represents water. In some embodiments, the spectral analysis logic 171 implements a classifier that has been trained on labeled imagery to generate the probability. For example, the spectral analysis logic 171 may employ a logistic regression model that uses the spectral bands of each pixel as features.

The flow simulation logic 172 uses the measured level of precipitation from the previous rainfall, along with a geographic elevation map of the field and absorption properties of the soil within the field, to estimate regions where rainwater is likely to pool. For example, an iterative algorithm can be used to estimate from a starting position of water from the rainfall on the field, where the water is likely to flow and in what quantities based on the elevation of the region and absorption rate of the soil. After a number of iterations, areas in the simulation which still contain water are marked as potential ponding areas.

The coupling logic 173 combines the results of the spectral analysis logic 171 with the results of the flow simulation logic 172. The coupling logic 173 works under the assumption that a pixel which accurately represents water has a greater likelihood to be surrounded by other water pixels, rather than by pixels representing dry land. As a result, a pixel which has a high probability of being a water pixel also increases the likelihood that neighboring pixels also represent water. In addition, the model assumes that pixels with a high probability of being water (as determined by the spectral analysis logic 171) and are in an area in which water is likely to pool (as determined by the flow simulation logic 172) has a higher probability of representing ponding water.

The coupling logic 173 formalizes the aforementioned concepts into a concrete workable model. For example, the satellite image could be viewed as a graph, where each node represents a pixel and is connected to the neighboring pixels with an edge. The probability that each pixel represents water is based on a weighted combination of value of the water probability map for the pixel and the likelihood of water pooling in the area represented by the pixel based on the flow simulation. For example, if the pixel has both a high probability of being water and is in a position where flooding is likely to occur, the probability of that pixel being ponding water is strengthened. However, if the two sub-models disagree (or agree the pixel represents dry-land), the probability of the pixel representing ponding water is decreased accordingly.

Furthermore, the probability of a pixel being ponding water is not considered in a vacuum, instead the probability of the neighboring pixels being ponding water is also taken into consideration. For example, bolstering the probability of representing ponding water if the neighbors are likely to be water pixels and weakening the probability if the neighbors are likely to be dry-land pixels. Thus, the model estimates the class (water or dry-land) for each pixel that maximizes the joint probability over the graph. In some embodiments, the coupling logic 173 utilizes a Markov Random Field (MRF) to model the coupling between the pixels. Furthermore, in some embodiments, the goal is to detect ponding water only on agricultural fields/cropland. As a result, a cropland field mask is utilized to filter out pixels which do not represent cropland, effectively preventing non-cropland pixels from being classified as ponding water.

The alert logic 174 uses the result of the coupling logic 173 (the per-pixel classification of water or dry-land) to generate an alert (e.g. emails, text messages, and so forth)

that is sent to a device of the farmer or other agricultural agent that warns of potentially dangerous ponding water on the fields and the specific location(s) to investigate. In some embodiments, in addition to the locations, the alert logic 174 also computes an optimal route for the farmer to take which visits all the discovered problem areas in the field(s).

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example System Inputs

The exact inputs to the ponding water detection subsystem 170 may vary in different embodiments. In order to provide concrete examples, the following passages identify specific example types of data that can be used by the spectral analysis logic 171, flow simulation logic 172, and/or coupling logic 173 to estimate potential problem areas within a field where ponding water is likely to have appeared. However, the techniques described herein are not limited to any particular type of inputs or any particular location, services, or tools used to collect the inputs.

3.1 Remote Sensing Data

In this disclosure, "remote sensing data" is used synonymously with "satellite imagery." Thus, many of the examples provided herein will be described using satellite imagery as the remote sensing data. However, the use of satellite imagery in the following examples does not limit the techniques herein solely to remote sensing data that is satellite imagery. As technology develops other types of remote sensing technology may appear and the techniques described herein are broad enough to make use of any emerging remote sensing devices and/or techniques. For example, as an alternative to satellite imagery, the techniques described herein may also apply to images taken by aircraft or drones flying over the field.

Many of the examples presented herein assume that the satellite imagery is capable of detecting various bands, such as the blue, green, red, red edge, and near infrared (NIR) bands at various resolutions. As a concrete example, the satellite imagery used as input to the model may be RAPID-EYE satellite image data, which offers multispectral images at a spatial resolution of 5 m. However, the techniques described herein are not limited to any particular type of satellite imagery.

The techniques described herein apply equally to situations where the satellite imagery can be captured on demand or are captured periodically. For example, the user 102 and/or operator of the agricultural intelligence computer system 130 may contract with a separate company that owns the satellites used to take the images. Depending on the contract, the remote sensing data used as input to the ponding water detection subsystem 170 may be updated on only on a period basis. As a result, in some cases, there may be a delay between rainfall occurring on the field and the image capture of the field by the satellite. Furthermore, depending on the number and positions of the satellites that are available, on demand images may not be possible until a satellite with appropriate positioning becomes available. However, in cases where the images can be taken on demand, the agricultural intelligence computer system 130 may be configured to communicate with a system of the satellite imagery provider and automatically request images in response to receiving user input via a device of the user 102, such as the field manager computing device 104, or after detecting a threshold amount of rainfall on the field from the remote sensor 112 or a separate weather base station located near the field.

3.2 Precipitation Data

Precipitation data represents current and/or historical rainfall of the field being analyzed by the ponding water detection subsystem 170. In some embodiments, the precipitation data is used by the flow simulation logic 172 to estimate areas or regions within the field that are likely to have collected ponding water after an instance of rainfall.

In some embodiments, the precipitation data may be stored by the model data and field data repository 160 based on readings taken from the remote sensor 112 or other sensors established in the general area of the field. However, in other embodiments, the precipitation data is collected from an external data server computer 108 belonging to a private weather service, public government weather collecting service, or any other service that collects and stores precipitation data for various areas, including the field to be analyzed.

In some cases, the precipitation data is resampled to match the spatial resolution of the satellite images, which can make some of the calculations described later more efficient to perform. For example, the precipitation data when resampled to the same resolution as the satellite image could be used to identify the amount of rainfall represented by each pixel of the satellite image.

3.3 Elevation Data

Elevation data represents the elevation of regions within the field. For example, the elevation data may take the form of a topography map or any other map that can provide a height of elevation for regions within the field. In some embodiments, the elevation data is used by the flow simulation logic 172 to estimate in which regions water would likely flow to during or after rainfall. For example, water tends to flow from high-elevation areas to low-elevation areas over time. In some cases, the elevation data is resampled to match the spatial resolution of the satellite images, which can make some of the calculations described later more efficient to perform. For example, the elevation data when resampled to the same resolution as the satellite image could be used to identify the height of the area represented by each pixel of the satellite image.

In some embodiments, the elevation data may be stored by the model data and field data repository 160 based on a survey of the field taken by the farmer or a private contractor. However, in other embodiments, the elevation data is collected from an external data server computer 108 belonging to a private or public service that surveys various land areas, including the field to be analyzed, and records the elevation of regions within the field. One example format for the elevation data is digital elevation model (DEM) raster format.

3.4 Soil Property Data

Soil property data represents the properties of the soil at various regions within the field. As water flows, the water infiltrates the soil at a rate dependent on the properties of the soil, such as water capacity and soil electrical conductivity. Thus, the flow simulation logic 172 can use the properties of soil found at various regions within the field (or just one if the soil is the same contiguous type throughout the field) to determine how much water is absorbed as it flows from higher elevation regions to lower elevation regions.

In some embodiments, the soil type data may be stored by the model data and field data repository 160 based on a survey of the field taken by the farmer or a private contractor. For example, most farmers either have implicit knowledge of the type of soil used in the field or have tested the soil of the field for various purposes, such as sending the soil for nutrient testing. Thus, the user 102 may be able to manually input the soil properties or have the field manager computing device 104 automatically enter the soil properties based on previously stored data. However, in other embodiments, the elevation data is collected from an external data server computer 108 belonging to a private or public service that analyzes and records soil properties for various areas, including the field under analysis. One example of external data 110 that indicates soil properties for regions within agricultural fields is the Soil Survey Geographic (SSURGO) database, which is a digital database about soil collected by the National Cooperative Soil Survey (NCSS). The aforementioned database provides soil data, such as electrical conductivity, field capacity, and so forth.

In some embodiments, the soil type property data (if a different resolution from the satellite image) is resampled to adhere to the same resolution as the satellite image. As a result, it becomes more efficient for the ponding water detection subsystem 170 to correlate the soil properties that correspond to the field area covered by a given pixel of the satellite data.

3.5 Cropland Data

Cropland data represents a mask identifying regions that are considered agricultural fields/cropland. For example, the Cropland Data Layer (CDL) is a raster, geo-referenced, crop-specific land cover data layer that is created annually for the continental United States using moderate resolution satellite imagery and extensive agricultural ground truth. Since one of the goals is to identify field areas where ponding water is likely to have appeared, the cropland data can be used to help accurately identify which geographical regions correlate to the agricultural field, as opposed to other areas such as lakes, oceans, mountains, or other geographical areas depicted in the image that are external to the field. Since land types other than agricultural fields/cropland can be ignored in some embodiments, the cropland data can help minimize noise that might appear if data pertaining to non-cropland areas were considered in the analysis. In some embodiments, the cropland data is resampled to be the same resolution as the satellite images, thus simplifying the process of correlating which pixels specifically pertain to cropland as identified by the cropland mask. Embodiments need not be used solely with cropland or agricultural fields, however; for example, an embodiment could be used to detect ponding water in large, valuable landscaped areas, such as golf courses.

4.0 Analysis Triggers

As a whole, the spectral analysis logic 171, flow simulation logic 172, coupling logic 173, and alert logic 174 together implement a coherent computer-executed process for analyzing data related to the field, determining whether and where ponding water is likely to have appeared, and providing alerts to a user 102 or other agent informing them of the ponding water that has been detected. The following are examples of criteria that can be used to trigger the process.

In some embodiments, the process is triggered as a result of the agricultural intelligence computer system 130 receiving a satellite image of the field. In some cases, depending on the contractual arrangements with the satellite image service provider, images of the field may only be available at periodic intervals (e.g. once a day, week, month, and so forth). As a result, some embodiments may begin the process of detecting ponding water as soon as a new image becomes available. In some cases the agricultural intelligence computer system 130 may receive the image from the computer system of the satellite image server provider without prompted (referred to as the "push" model of data collection). Alternatively, the agricultural intelligence computer system 130 may send a message asking for an updated image if one is available (referred to as the "pull" model of data collection).

In other embodiments, the agricultural intelligence computer system 130 may be configured to send a message to a computer system of the satellite image service provider requesting that an image be taken at the present or near-present time. Thus, as one example, the agricultural intelligence computer system 130 may, via a user interface of the field manager computing device 104, receive user input specifying to request an updated image. In response, the agricultural intelligence computer system 130 sends a message to the computer system of the satellite image service provider requesting a new image be taken. In other embodiments, the agricultural intelligence computer system 130 is configured to request an image if particular criteria are met. For example, in response to receiving data indicating a threshold amount of rainfall has occurred (e.g. from the remote sensor 112 on the field or a weather station in proximity to the field), the agricultural intelligence computer system 130 automatically requests an updated image and begins the detection process.

5.0 Spectral Analysis

The spectral analysis logic 171 is programmed to analyze spectral bands from the satellite image and provides a water probability map for the field which indicates the probability that that a given pixel represents water.

In an embodiment, the spectral analysis logic 171 determines the probability that a given pixel represents water by training a classifier on labeled data (also referred to as the "ground truth") and feeding the features of each pixel to the trained classifier.

Many machine learning techniques, such as classifiers and certain types of regression, involve the estimation of a function that maps between a set of inputs (referred to as features) and a set of outputs (referred to as classes or labels). The estimation of the function, referred to as "training", is typically performed by analyzing a "training set" of features and their corresponding labels. By some definitions, a classifier outputs discrete labels whereas techniques based on regression produce continuous output values. However, for certain types of regression, such as logistic regression which produces a probability of being one of potentially two outcomes, this distinction is largely meaningless. For simplicity, the examples provided herein will refer to the machine learning technique used by the spectral analysis logic 171 as classification. However, the aforementioned terminology is not intended to exclude other machine learning techniques, such as regression.

During the analysis, an optimization is performed to find the function that best explains the mapping between the features and the corresponding labels in the labeled training set. The terms "best", "maximum", and/or "optimum" as used herein do not necessarily refer to a global metric. In many cases a local maximum of the likelihood of the mapping between the features and the label given the function is sufficient. Different machine learning techniques perform the aforementioned optimizations in different ways. For example, naive Bayes classifiers assume independence of the features given the class and estimate a function that explains the association between the features and the label. As another example, artificial neural networks model the problem domain as systems of interconnected nodes (representing "neurons") which send messages to one another, often with some nodes representing the inputs, some nodes representing intermediary or "hidden" nodes, and some nodes representing the outputs. Thus, in such models, the estimation of the function involves determining the optimal weights between the edges connecting the nodes that are most likely to explain the mappings presented in the training set. Once a classifier is trained, a new data point of features can be fed into the classifier to obtain the predicted label for that data point. In most cases, classifiers output a set of potential labels and a confidence metric or other measure of the probability that the classification is correct. In most cases, the label to which the classifier assigned the highest confidence is considered the predicated label.

In the present problem domain the features are the various spectral bands recorded for each pixel of the satellite image and the class is binary, potentially classifying the pixel as a water pixel or dry-land pixel. The techniques described herein are not limited to any particular type of classifier. For example, the classifier utilized by the spectral analysis logic 171 may include support vector machines (SVMs), neural networks, logistic regression, Bayesian techniques, perceptrons, decisions trees, and more without limitation. In order to provide clear examples, the remainder of this disclosure will assume the use of logistic regression which has shown accurate results in practice, but the techniques are not necessarily limited to logistic regression.

The exact features to utilize for the classifier can be determined in many different ways. In some embodiments, the features are selected based on domain knowledge or selected manually by testing various combinations of features and choosing those which appear to produce the most accurate results. For example, after significant testing, the NIR band, red band, and vegetation indices (specifically the Transformed Soil Adjusted Vegetation Index (TSAVI)) were found to be reasonable features on which to train the classifier. As a result, the examples provided herein assume that the aforementioned features are used for the classification. However, the techniques described herein are adaptable enough to accommodate any features that could conceivably be used as a basis for water detection, including but not limited to the blue band, green band, red band, red edge band, NIR band, TSAVI, soil electrical conductivity, elevation, compound topographic index (CTI), soil field water capacity, and so forth. In some embodiments, the spectral analysis logic 171 may only use the NIR band as a feature for the classification. For example, some data in practice has shown that the NIR band might be more indicative of water than any of the other bands. Thus, in some embodiments, the NIR band is used as the sole feature to potentially remove noise from the training of the classifier.

5.1 Preparing Ground Truth Data

As mentioned previously, labeled "ground truth" data is required in order to train the classifier and develop the optimum function between the features and the classifications. The labeled data set can be collected in a myriad of different ways.

One way is to collect a sample of satellite images representing typical fields that one would encounter after rainfall has occurred. The precipitation data for the areas covered by those sample satellite images can be used to verify that rainfall has occurred shortly before the image was taken, increasing the likelihood that at least some ponding water exists within the image to train the classifier. However, in some cases, including images with no ponding water might be used as negative examples for training the classifier. The sample images can then be manually labeled by experts within the field to identify which pixels represent water and which represent dry-land. Those labels can then be used as the "ground truth".

However, other techniques use automatic or partially automatic methods for detecting water in the sample images to produce the labeled "ground truth" data. For example, water features may be identified within the sample satellite images using the Image Band Correlation Tool (IBCT) in TNTmips software, commercially available from MicroImages, Inc, of Lincoln, Nebr. The IBCT uses the tasseled cap method and plots the correlations between the red and NIR bands. Using the IBCT, regions within the sample images that represent water can be identified based on the pixels within those regions being at or below a particular threshold for NIR and red reflectance. The pixels covered by those regions are then exported as a binary raster file for each of the sample images. The binary raster file then represents a ponding water mask that identifies the regions of water pixels. Next, the ponding water mask is refined by comparing the mask to imagery that identifies known permanent bodies. The pixels within the mask which correlate to known bodies of water can be removed, leaving the remaining portions of the mask as indicative of ponding water. Alternatively, the ponding water mask can be refined by looking at satellite imagery from other time periods. If a body of water appears in both the sample images and in the historical images of the area, there is a strong likelihood those bodies of water are permanent, rather than temporary ponding water. As an example source for the historical images, the National Agricultural Imagery Program (NAIP) provides images of agricultural fields which can be used for this purpose.

5.2 Training and Using the Classifier

Figure 5:
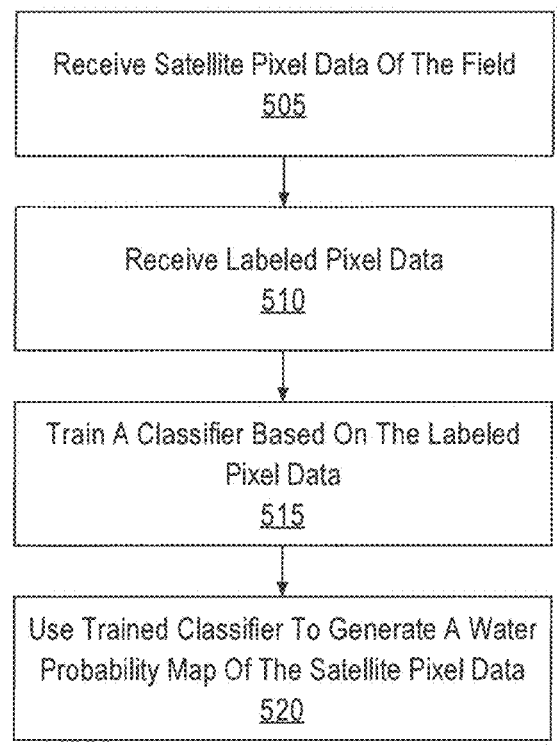
FIG. 5 illustrates a process for generating a water probability map for a satellite image in block diagram form according to an embodiment.

FIG. 5 illustrates a process for generating a water probability map for a satellite image in block diagram form according to an embodiment. The following explanation assumes that the spectral analysis logic 171 implements the process illustrated in FIG. 5. FIG. 5 illustrates specific blocks that have been laid out in a particular order. However, in other embodiments, blocks may be added, removed, divided out, merged, or rearranged compared to FIG. 5. The techniques described herein are not limited to the exact blocks in the exact order illustrated in FIG. 5.

At block 505, the spectral analysis logic 171 receives satellite pixel data of the field to be analyzed. In an embodiment, the spectral analysis logic 171 retrieves the satellite image from the model data and field data repository 160. However, in other embodiments, or if the model data and field data repository 160 does not possess an image of the field, the spectral analysis logic 171 may request the satellite image from an external data server computer 108 of a satellite image provider service via the communication layer 132. Additional techniques that could be used to receive the satellite pixel data is described above in Section 3.1.

At block 510, the spectral analysis logic 171 receives labeled pixel data to be used as a training set for the classifier. Depending on the embodiment, the spectral analysis logic 171 may retrieve the labeled pixel data from the model data and field data repository 160 or an external data server computer 108 of a label provider. Additional techniques that could be used to receive or generate the labeled pixel data is described above in Section 4.1. In some embodiments, the spectral analysis logic 171 may train the classifier pre-emptively and store the learned function and/or coefficients of the learned function in the model data and the field data repository 160. In such cases, the spectral analysis logic 171 can skip block 510 and block 515 and instead proceed to block 520.

At block 515, the spectral analysis logic 171 trains a classifier based on the labeled pixel data. Depending on the embodiment, the classifier may be one or more of a neural network, a SVM, a Bayesian classifier, a perceptron, logistic regression, or any other machine learning technique. However, in order to provide a clear explanation, an example is provided below that utilizes logistic regression as the classifier. The example below assumes that the features are the red band, NIR band, and vegetation index with the output probability being the probability of being a water pixel as opposed to a dry-land pixel.

The general logistic regression model is as follows:

$$W_{i,j} = \frac{1}{1 + e^{-A^T X}} \quad \text{(Equation 1.0)}$$

Where $W_{i,j}$ is the water probability of pixel (i,j), X is the feature vector and A is the coefficient vector. Thus, the training of the logistic regression model involves determining the coefficient vector A that best describes the relationship between the feature vector X and the water probability for each pixel of the images included in the labeled pixel data. For example, the labeled training set may consider the probability is 1 if labeled as water and 0 if labeled as dry-land.

In the model above, the feature vector X is a linear combination of variables, in this case NIR reflectance, Red reflectance, and the vegetation index TSAVI. The vegetation index TSAVI is computed via the following equation, $$TSAVI = \frac{a[NIR - (a * \text{Red}) - b]}{\text{Red} + (a * NIR) - (a * b)} \quad \text{(Equation 2.0)}$$

where a and b are the slope and intercept of the soil line. In an embodiment, the slope and intercept of the soil line are not calculated for individual scenes. Instead, a median soil line slope and intercept can be used. For example, setting a=1.2 and b=0.04 has been shown in testing to produce accurate results.

The coefficients A are then estimated using the maximum likelihood method (MLE), which is a well-known technique for estimating the parameters of a statistical model.

In some embodiments, in order to improve the time and resources required to train the classifier, the spectral analysis logic 171 only uses a subset of the pixels from the labeled pixel data. For example, an embodiment might use all water pixels but only a subset of the dry-land pixels when training the classifier, rather than all the labeled pixels available.

At block 520, the spectral analysis logic 171 uses the trained classifier to generate a water probability map of the satellite pixel data received at block 505. In an embodiment, for each pixel of the satellite image, the spectral analysis logic 171 retrieves the features for that pixel and uses the trained classifier to produce a water probability. Using the logistic regression example above, each pixel of the satellite image would have the NIR and red bands extracted, the TSAVI computed, and those features would be plugged into the feature vector X to compute the water probability W using the previously determined coefficients A. The collection of water probabilities over the pixels results in a water probability map that indicates the probability of a given pixel in the image representing water. The spectral analysis logic 171 then records the water probability map in the model data and field data repository 160 for later use by the coupling logic 173.

6.0 Flow Simulation

Figure 6:
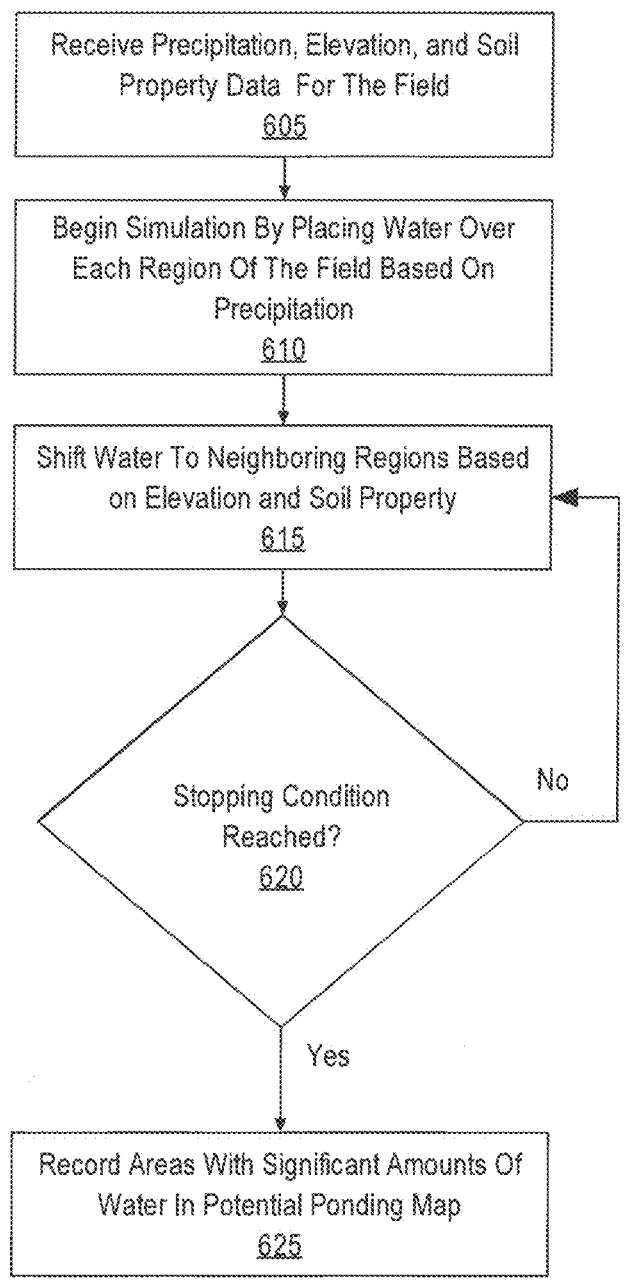
FIG. 6 illustrates a process for generating a potential ponding map for a field in block diagram form according to an embodiment.

FIG. 6 illustrates a process for generating a potential ponding map for a field in block diagram form according to an embodiment. The following explanation assumes that the flow simulation logic 172 implements the process illustrated in FIG. 6. FIG. 6 illustrates specific blocks that have been laid out in a particular order. However, in other embodiments, blocks may be added, removed, divided out, merged, or rearranged compared to FIG. 6. The techniques described herein are not limited to the exact blocks in the exact order illustrated in FIG. 6.

At block 605, the flow simulation logic 172 receives precipitation, elevation, and soil property data for the field. In an embodiment, the flow simulation logic 172 receives the precipitation, elevation, and soil property data from either the model data and field data repository 160 or from one or more external data 110 sources. Additional details regarding the collection of the precipitation data, elevation data, and soil property data is described above in Sections 3.2, 3.3, and 3.4 respectively.

At block 610, the flow simulation logic 172 begins the simulation by placing water over each region of the field based on precipitation. To begin the simulation, an initial water level is set for each region of the agricultural field. In some embodiments, each region is a pixel of the satellite image used by the spectral analysis logic 171. However, in other embodiments, pixels may be grouped into larger regions to speed up the simulation, with some loss of accuracy due to the decreased resolution. In an embodiment, the initial water level is set based on the precipitation data. If the precipitation data is available at the same resolution as the regions, each region can be set to a water level equal to the last rainfall encountered by that region. However, often times the precipitation data will be at a lower resolution than the regions. Thus, in such cases, an assumption is made that all locations which share the same sensor 112 or weather station have the same amount of precipitation.

At block 615, the flow simulation logic 172 shifts water to neighboring regions based on elevation and soil property. During the simulation, the water placed on each region is assumed to flow at a particular rate to neighboring regions and should be the same when the flow stops. This is performed iteratively, with block 615 being performed until a stopping condition is reached at block 620. During each iteration, an amount of water is removed from higher elevation regions and added to lower elevation neighbors until the total elevation (ground elevation+added elevation due to the water) is even between the neighbors. The water flow may be a static amount, or may be dependent on the difference in the height between the high-elevation pixels and the lower-elevation neighbors. In some cases, a percentage of the water may be moved at each iteration.

The following pseudo-code provides an example of how the water flows to neighbors during block 615. However, embodiments are not limited to the algorithm shown in the example pseudo-code. The following pseudo-code assumes that the water values at each region has already been set at block 610, region positions are given by [row, col], N represents the number of columns, M represents the number of rows, lidar represents a matrix of elevations at each region, and water represents a matrix of water quantities at each region. The pseudo-code is broken into two sub-parts, one which controls the horizontal flow of water and one which controls the vertical flow of water. In an embodiment, each iteration of block 615 involves executing each sub-part one time. The pseudo-code below uses instructions and/or commands similar to R, an open source system widely used for analysis of large sized data. However, embodiments are not limited to being implemented using R and may be implemented using any number of programming languages, such as Java, C++, Ruby, Perl, and so forth.

```
#water flows from left to right (negative value means right to left)
for col =1 to N-1
{
elev1 <- lidar.matrix[, col] # returns a vector of elevation for column col
elev2 <- lidar.matrix[,col+ 1] # returns a vector of elevation for column col+ 1
water1 <- water.matrix[, col] #returns a vector of water amount for col
water2 <- water.matrix[, col+ 1] #returns a vector of water amount for col + 1
total.water <- water1 + water2
diff <- elev1 - elev2
# redistribute / rebalance the water for the two columns
water.level <- pmax(total.water - diff, 0) / 2
water.matrix[,col] <- pmin(water.level, total.water)
water.matrix[, col+ 1] <- total.water - water.matrix[,col]
}
#water flows downside (negative value means upside)
for row =1 to M-1
{
elev1 <- lidar.matrix[row, ] # returns a vector of elevation for row
elev2 <- lidar.matrix[row + 1,] # returns a vector of elevation for row + 1
water1 <- water.matrix[row,] # returns a vector of water amount for row
water2 <- water.matrix[row + 1, ] #returns a vector of water amount for row +1
total.water <- water1 + water2
diff <- elev1 - elev2
# redistribute / rebalance the water for the two rows
water.level <- pmax(total.water - diff, 0) / 2
water.matrix[row,] <- pmin(water.level, total.water)
water.matrix[row + 1, ] <- total.water - water.matrix[row,]
}
```

As water flows a certain amount of water will infiltrate into the soil. The exact amount of infiltrated water depends on many factors, such as soil electrical conductivity, available water capacity, flow duration, flow rate, direction, and so forth, which can be very difficult to accurately model. However, to determine potential ponding areas, an exact physical model is not required. In an embodiment, the flow process is simplified by using available water capacity as the sole factor, which has been shown through experimentation to have the largest impact on whether water will be ponded. Thus, as water flows, an amount of water proportional to the water capacity is removed due to infiltration and not added to the neighboring region.

With the above assumption, let the proportionality coefficient be $\alpha$. For each region, the amount of water that contributes to ponding is $\alpha C(i, j)$, where $C(i, j)$ is the water capacity for region $(i, j)$. The value of a may be set based on domain knowledge or through experimentation to determine a value that appears to produce accurate results.

At block 620, the flow simulation logic 172 determines whether a stopping condition for the simulation has been reached. In an embodiment, the stopping condition is to run the simulation for a pre-determined number of iterations. However, in other embodiments, the stopping condition for the simulation may be when a convergence point is reached where water has stopped shifting to neighbors or less than a threshold amount of water has shifted during the previous iteration. The stopping conditions may even be combined, using the number of iterations as a way to prevent the simulation from taking an excessive amount of time to converge. For example, the stopping condition may be convergence or a pre-set number of iterations, whichever occurs first.

At block 625, the flow simulation logic 172 records areas with pooled water in a potential ponding map. After the stopping condition at block 620 has been triggered, regions which still have water on them are marked in the potential ponding map. For example, the map may be a bitmap of the regions or pixels that identifies ponding water using the value 1 for water and 0 for dry-land. Thus, the potential ponding map identifies the regions where water is likely to have ponded after rainfall. The potential ponding map is then stored in the model data and field data repository 160 for later use by the coupling logic 173.

7.0 Coupling Analysis

Figure 7:
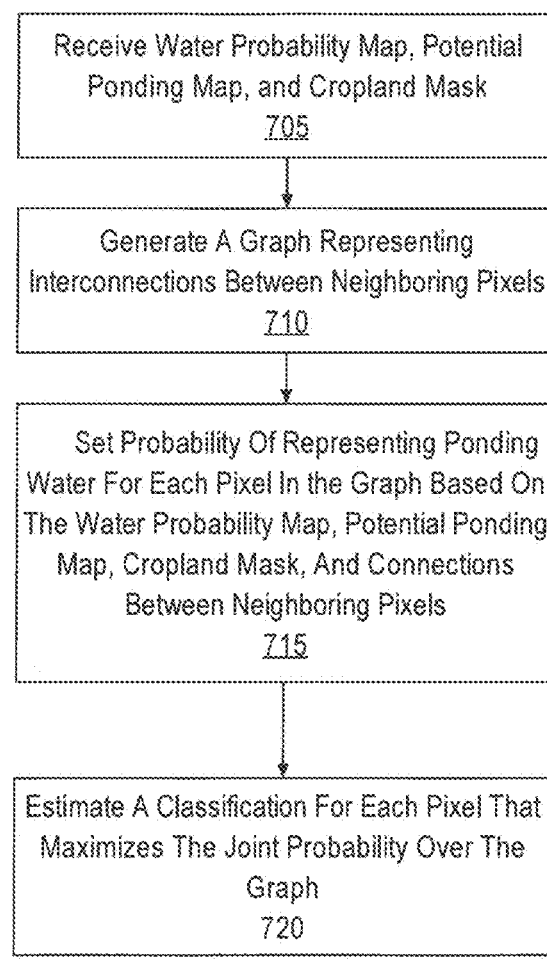
FIG. 7 illustrates a process for generating a per-pixel ponding water classification of a satellite image in block diagram form according to an embodiment.

FIG. 7 illustrates a process for generating a per-pixel ponding water classification of a satellite image in block diagram form according to an embodiment. The following explanation assumes that the coupling logic 173 implements the process illustrated in FIG. 7. FIG. 7 illustrates specific blocks that have been laid out in a particular order. However, in other embodiments, blocks may be added, removed, divided out, merged, or rearranged compared to FIG. 7. The techniques described herein are not limited to the exact blocks in the exact order illustrated in FIG. 7.

The classification of water pixels based on some machine learning techniques, such as logistic regression, do not consider the coupling effects between neighboring pixels. For example, for two pixels with the same NIR band values, the pixel surrounded by water pixels is more likely to actually represent water than the pixel surrounded by dry-land pixels. The coupling logic 173 models such effects to increase the reliability and accuracy of the probability estimations produced by the spectral analysis logic 171. Furthermore, the spectral analysis logic 171 is also reconciled with the results of the flow simulation logic 172. Pixels which have a high probability of being water as determined by the spectral analysis logic 171 and are also in locations where ponding water is likely to occur as determined by the flow simulation logic 172 are more likely to represent ponding water. Whereas pixels for which the spectral analysis logic 171 and the flow simulation logic 172 disagree are considered less likely to represent ponding water.

In the following example a Markov Random Field (MRF) is utilized to model the aforementioned effects. However, the techniques described herein are not limited to using MRFs to model the coupling between pixels. In the examples below, the MRF model takes as input, the water probability map generated by the spectral analysis logic 171, the potential ponding map produced by the flow simulation logic 172, the band values of each pixel in the satellite image, and a cropland mask identifying which pixels represent agricultural fields. The examples below also assume that logistic regression was the classification technique utilized by the spectral analysis logic 171 to generate the water probability map, but this is not required in all embodiments.

At block 705, the coupling logic 173 receives a water probability map, a potential ponding map, and a cropland mask. In an embodiment, the coupling logic 173 receives the water probability map, potential ponding map, and cropland mask from the model data and field data repository 160. For example, the water probability map may have been previously produced by the spectral analysis logic 171 and stored in the model data and field data repository 160. Additional details regarding the generation of the water probability map are provided above in Sections 4.0-4.2. The potential ponding map may have been previously produced by the flow simulation logic 172 and stored in the model data and field data repository 160. Additional details regarding the generation of the potential ponding map are provided above in Section 5.0. The cropland mask may have been previously received from an external data server computer 108 and stored in the model data and field data repository 160. Additional details regarding the cropland mask are provided above in Section 3.5.

At block 710, the coupling logic 173 generates a graph representing interconnections between neighboring pixels. The graph of the MRF (a set of vertices V and edges E) is constructed as follows. For every two neighboring pixels (4-neighbor) i and j, there is an edge (i, j)∈E that connects node i and node j. Each node represents a random variable Y which is 1 if ponding water or 0 if dry-land.

At block 715, the coupling logic 173 sets the probability of representing ponding water for each pixel in the graph based on the water probability map, potential ponding map, cropland mask, and the connections between neighboring pixels.

In an embodiment, for a given pixel p, $W_p$, $S_p$, and $M_p$ (representing water probability map value, potential ponding map value, and cropland mask value for the pixel respectively) are available as well as the band values for the pixel. The goal is to estimate $Y_p$, the class label for the pixel. Unlike logistic regression which estimates $Y_p$ for each individual pixel, the coupling logic 173 estimates $Y_p$ by maximizing the joint probability for all pixels, i.e. $P(Y)=P(Y_1, Y_2, \ldots, Y_N)$, where N is the total number of pixels. The joint probability of all random variables $Y_i$ is then given by, $$P(Y) \propto \prod_{i \in V} f(Y_i) \prod_{(i,j) \in E} g(Y_i, Y_j) \quad \text{(Equation 3.0)}$$

where $f(Y_i)$ is the potential function for node i and $g(Y_i, Y_j)$ is the potential function for the edge between node i and node j. The function $f$ is composed of three components, $f(Y_i)=f_w(Y_i)f_s(Y_i)f_m(Y_i)$.

To specify node potential $f_w$, the probability map W is utilized. The class with higher probability has a higher potential. To avoid zero values, let $f_w(Y_i)=1+W(Y_i)$. For edge potential g, the assumption can be made that the closer the difference between the NIR values of the pixels, the more likely that those pixels will have the same class labels. Therefore, g can be modeled as a function of the NIR difference, $$g(Y_i, Y_j) = \begin{cases} 1 + e^{-|NIR_i - NIR_j|/D} & \text{if } Y_i = Y_j \\ 1 & \text{if } Y_i \neq Y_j \end{cases} \quad \text{(Equation 4.0)}$$

Where D controls the decreasing rate of the potential value, which can be set based on experience with the problem domain or by testing values to determine one that appears to work best. For example, D may be set to 3000 which has shown good performance in testing.

To take the simulation results into account, the ponding map S is utilized. The pixel i is considered a ponding pixel if $S_i=1$ and not ponding if $S_i=0$. The water probability from images will be strengthened if coinciding with the simulation results, and weakened otherwise. Therefore, $f_s(Y_i=S_i)=\exp(\beta)$ and $f_s(Y_i \neq S_i)=1$, where $\beta$ represents the importance weight of the simulation results. For $\beta=0$, the results of the simulation are essentially discarded. With increasing $\beta$, more importance is placed on the simulation results. The value for $\beta$ may be set based on knowledge of the problem domain or determined after testing various values to determine one that works well. For example, $\beta=\ln(2)$ has shown good results during testing. For the mask map M, $f_M(Y_i=1)=\exp(-\inf)$ and $f_M(Y_i=0)=1$ for $M_i=1$ (not cropland) and $f_M(Y_i)=1$ for $M_i=0$ (cropland). Thus, pixels which are not cropland are essentially classified as not being ponding water since those areas are not the focus of the analysis. However, in other embodiments, the cropland mask may be omitted if the satellite image is known to only contain pixels related to cropland. Furthermore, the techniques described herein may be applied to satellite images for non-cropland areas, such as determining areas where ponding water has accumulated that may be at risk for attracting dangerous insects, such as mosquitos. In such cases, the cropland mask may be omitted if the area being analyzed does not specifically pertain to cropland.

If F, G, $F_W$, $F_S$, $F_M$ are set to be the negative logarithm form of $f$, $g$, $f_w$, $f_s$, and $f_m$, respectively, then $$E(Y) = \sum_{i \in V} F(Y_i) + \sum_{(i,j) \in E} G(Y_i, Y_j) \quad \text{(Equation 5.0)}$$

$$= \sum_{i \in V} F_W(Y_i) + \sum_{i \in V} F_S(Y_i) + \sum_{i \in V} F_M(Y_i) + \sum_{(i,j) \in E} G(Y_i, Y_j)$$

Thus, the joint probability is, $$P(Y) \propto \exp(-E(Y)) \quad \text{(Equation 6.0)}$$

At block 720, the coupling logic 173 estimates a classification for each pixel that maximizes the joint probability over the graph. In an embodiment, maximizing the joint probability is equivalent to minimizing the energy function E(Y). As an example, minimizing the energy function E(Y) could be performed using Loopy Belief Propagation (LBP), which is an iterative algorithm. After a threshold number of iterations, the algorithm converges and a suboptimum set of labels will be generated for each pixel. When N is large, the inference process may be very time consuming. However, in some embodiments, to increase the efficiency of the inference process each tile considered by LBP can be broken down into multiple sub-tiles. The end result is a ponding water map that identifies, for each pixel of the satellite image of the agricultural field, whether that pixel represents ponding water or dry land. The ponding water map is then stored in the model data and field data repository 160 for later use by the alert logic 174.

8.0 Alert Examples

The alert logic 174 represents instructions used by the ponding water detection subsystem 170 to generate alerts based on the detection of ponding water by the coupling logic 173.

In some embodiments, when the coupling logic 173 produces the ponding water map, if the map shows areas of significant ponding water, the coupling logic 173 invokes the alert logic 174 (e.g. through an API, method/function call, inter-process communication mechanism, and so forth). For example, in order to avoid cases where a very small region, such as a single pixel of ponding water, triggers an alert a threshold number of neighboring pixels classified as ponding water may be used to determine if the ponding is significant. If the ponding water is determined to be significant, the alert logic 174 is invoked. However, in some embodiments, the coupling logic 173 is configured to invoke the alert logic 174 if any ponding water pixels are detected on cropland.

Once invoked, the alert logic 174 retrieves the ponding water mask from the model data and field data repository 160 and produces one or more alerts. In some embodiments, the alerts take the form of a message or messages sent to a device associated with the user 102 which specify that ponding water has been detected in the field. As one example, the message may include the coordinates corresponding to the pixels which have been identified as containing ponding water. As another example, the message may contain or provide a link to map that displays the field or fields where ponding water has been detected and highlights the pixels determined to contain ponding water, such as by displaying them in a particular color. The message may be sent in a myriad of different ways. For example, the message may take the form of an automated phone call or text message sent to a mobile phone associated with the user 102. As another example, the message may take the form of an email sent to an email account associated with the user 102. As yet another example, the field manager computing device 104 may execute an application which is configured to interface with the alert logic 174 and receive messages for display to the user 102. As yet another example, the agricultural intelligence computer 130 may be configured as a web server or host a component capable of running a web server. In such cases, the message could contain a link to a website hosted by the agricultural intelligence computer system 130 which displays the alert and/or location information for the detected ponding water. The exact alert generated and the manner in which the alert is communicated to a device of the user 102 is not critical.

8.1 Guided Tour of Problem Areas

In an embodiment, the alert logic 174 estimates an shortest path for the user 102 or an agent of the user 102 to take to visit the areas of ponding water identified by the coupling logic 173. For example, the field may have multiple areas of ponding water which the user 102 or an agent will need to physically visit to either verify that ponding water actually exists at that location and/or begin the process of draining the ponding water from the field.

Estimating the optimum path to visit all the affected areas can be accomplished using techniques similar to solutions to the Traveling Salesman Problem (TSP). TSP is a well-known problem in computer science where, given a list of cities and the distances between each pair of cities, the goal is to find the shortest route possible that visits each city exactly once and returns to the point of origin. In the present case, the "cities" are the various locations where ponding water has been detected. However, other aspects of the problem can in some embodiments be modified to better suit the task of traversing an agricultural field. For example, the model data and field data repository 160 may store information related to the field such as which crops are growing in which locations and the current stage of their growth cycle. Some crops may be more vulnerable to ponding water depending on type and growth stage. As a result, if the detected ponding water locations correlate to areas where vulnerable crops are known to be located, those areas may be prioritized over other areas. In addition, affected areas may be prioritized by the amount of water detected. For example, the number of interconnected ponding water pixels may indicate a severity of the ponding water at that location. The prioritization may be accomplished by penalizing routes that place the prioritized areas later in the route. For example, the distance metric for paths leading to the prioritized areas may be given a weight to artificially increase the distance the later the area is placed along the route. In addition, straight line paths may not be available between the detected ponding water areas. Thus, provided a map of the roads or trails to reach areas across the field are known or can be obtained from external data 110, the distance between the affected areas may be set to incorporate the distance of the known roads or trials that connect the ponding water areas instead of the straight line distance. There are several well-known solutions to the TSP, such as trying all permutations of routes (also known as brute force search) as well as heuristic and approximation algorithms (for example, nearest neighbor, pairwise exchange, Christofides' algorithm, etc.). After a solution has been obtained, the alert logic 174 sends a message to a device associated with the user 102 that includes or links to a map identifying the shortest route. Additionally or alternatively, the route may also be given in the form of written directions.

8.2 Weather Index Insurance Applications

Weather Index Insurance (WII) is a relatively new insurance system that provides a payout based on measurable weather phenomenon, rather than actual loss to crop yield. In many locations in the world it can be difficult or expensive for insurance companies to send out an agent to verify crop loss. However, with WIT, the insurance companies instead identify weather phenomenon, such as floods, droughts, heat, cold, and so forth that are known to cause loss in crop yield. The farmer and the insurance company then agree upon the criteria that will be used to determine the payout and the amount of the payout based on the estimated crop loss due to specific weather phenomenon. For example, if temperatures in excess of 100 degrees are observed for seven days in a row while the crop was in an early growth stage, the insurance policy pays out. Since it is often times cheaper and more efficient to detect weather phenomenon, such as by satellite imagery, weather stations, and other sensing technologies, than to send out physical agents to verify actual crop loss, it becomes far easier for both parties to determine when payout of the insurance policy should occur.

In some embodiments, the agricultural intelligence computer system 130 includes components which maintain a WII monitoring service or is configured to communicate with a WII monitoring service. In some embodiments, in cases where the user 102 has an account with a WII policy based on flooding, the alert logic 174 is configured to send an alert message to the WII monitoring service in addition to or instead of a device of the user 102. For example, the message may include the areas which have accumulated ponding water, how long the ponding water has estimated to be on the field, what crops were planted on those fields, the current growth stage of the crop, and so forth. The aforementioned information may be collected from the model data and field data repository 160 or estimated based on information from the model data and field data repository 160. For example, time the water was on the field may be determined by using precipitation data to determine when rainfall occurred and comparing that date to the time at which the ponding water analysis was performed. If the WII monitoring service determines that the information contained in the message sent by the alert logic 174 meets the criteria for a WII policy, the WII monitoring service may flag the policy for payout.

9.0 Alternative Applications

In many of the embodiments described above, the spectral analysis logic 171, flow simulation logic 172, coupling logic 173, and alert logic 174 have been described as detecting ponding water within an agricultural field and alerting a user if ponding water is detected. However, detecting ponding water is useful even for geographic areas which do not represent agricultural fields. For example, golf courses span large areas and maintain grasses that are costly to replace and maintain. Thus, the ponding detection techniques described herein may also be employed to detect ponding water on a golf course and alert an employee to drain affected areas. As another example, residential or park areas may be at risk of dangerous insects that are known to breed in ponded water, such as mosquitos which are known to spread disease. A government agency may employ the techniques described herein to detect ponding water that may act as an incubator for such insects and deploy teams to drain the area to limit the risk of infection. As yet another example, ponding water is also known to pool of residences, such as houses or apartment buildings, which can eventually lead to roof damage. Thus, the same ponding water detection techniques can be employed on images of residential areas to detect ponding water on roofs and alert the residence of the need to rectify the problem. In cases where the techniques described herein are applied to non-cropland areas, the coupling logic 173 may omit the cropland data, since cropland is not the target of the detection, and may instead employ other type of masks that identify the golf course, park, residential areas, and so forth.

10.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

11.0 Additional Disclosure

Aspects of the subject matter described herein are set out in the following numbered clauses:

1. A method comprising: a computer system receiving image data of a field comprising a plurality of pixels, precipitation data for the field indicating one or more amounts of rainfall over one or more regions of the field, elevation data indicating one or more elevations over the one or more regions of the field, and soil property data indicating one or more properties of soil found across the one or more regions of the field; the computer system using a classifier that has been trained to identify water pixels to estimate a probability of representing water for each pixel of the plurality of pixels; the computer system running a flow simulation over the field based on the precipitation data, the elevation data, and the soil property data to identify a set of pixels within the image data that are likely to have ponding water after the rainfall; the computer system determining a class for each pixel of the plurality of pixels indicating whether the pixel represents ponding water based on the probability of representing water for each pixel of the plurality of pixels and the set of pixels within the image data that are likely to have ponding water after the rainfall; the computer system generating an alert based on the determination of the class for each pixel of the plurality of pixels.

2. The method of Clause 1, wherein the image data is satellite image data.

3. The method of any of Clauses 1-2, wherein the classifier is logistic regression that has been trained on labeled pixel data derived from one or more images of one or more agricultural fields.

4. The method of any of Clauses 1-3, wherein running the flow simulation includes: initializing a water level for each region of a plurality of regions of the field; iteratively rebalancing water levels between the plurality of regions, wherein at each iteration water flows from higher elevation regions to neighboring lower elevation regions based on the elevation data until a stopping condition occurs, wherein as water flows from the higher elevation regions to the neighboring lower elevation regions an amount of water is removed by being absorbed by soil based on the soil property data; after iteratively rebalancing the water levels between the plurality of regions of the field, using regions of the plurality of regions which still contain water to identify the set of pixels within the image data that are likely to have ponding water after the rainfall.

5. The method of any of Clauses 1-4, wherein each pixel of the plurality of pixels comprises one or more light bands and determining the class for each pixel of the plurality of pixels includes: generating a model, wherein the model includes a graph comprising a set of vertices, each vertex in the set of vertices representing a respective pixel of the plurality of pixels, and a set of edges representing connections between neighboring pixels of the plurality of pixels; for each vertex in the set of vertices, setting a probability of being ponding water based on the one or more light bands for the pixel represented by the vertex, the probability of representing water for the pixel represented by the vertex, whether the pixel represented by the vertex is in the set of pixels that are likely to have ponding water, and a probability of neighboring pixels of the pixel represented by the vertex being ponding water; determining a class for each vertex in the set of vertices that maximizes a joint probability over the graph.

6. The method of Clause 5, wherein the model is implemented using a Markov Random Field.

7. The method of any of Clauses 5-6, wherein the model increases the probability of being ponding water for a given vertex when the probability of representing water for the pixel represented by the given vertex indicates that the pixel represented by the given vertex likely represents water and the pixel represented by the given vertex is in the set of pixels that are likely to have ponding water.

8. The method of any of Clauses 5-7, further comprising receiving cropland data that indicates which pixels of the plurality of pixels corresponds to cropland, wherein the model classifies the pixel represented by a given vertex as not ponding water if the cropland data indicates that the pixel represented by the given vertex does not correspond to cropland.

9. The method of any of Clauses 1-8, wherein generating the alert includes sending a message to a user device that specifies ponding water has been detected on the field and one or more locations where the ponding water has been detected based on pixels which have been classified as representing ponding water.

10. The method of any of Clauses 1-9, wherein generating the alert includes identifying a shortest route to visit each area on the field corresponding to pixels which have been classified as representing ponding water.

11. One or more non-transitory computer-readable media storing instructions that, when executed by one or more computing devices, causes performance of any one of the methods recited in Clauses 1-10.

12. A system comprising one or more computing devices comprising components, implemented at least partially by computing hardware, configured to implement the steps of any one of the methods recited in Clauses 1-10.

What is claimed is:

1. A method comprising:
a computer system receiving image data of a field comprising a plurality of pixels, precipitation data for the plurality of pixels of the image data of the field indicating one or more amounts of rainfall over one or more regions of the field, elevation data indicating one or more elevations over the one or more regions of the field, and soil property data indicating one or more properties of soil found across the one or more regions of the field;
the computer system running a flow simulation over the plurality of pixels of the image data of the field to identify, using regions of a plurality of regions which still contain water, a set of pixels within the image data that are likely to have ponding water after rainfall;
for each pixel, from the set of pixels within the plurality of pixels:
estimating, using a classifier trained to estimate probabilities that pixels represent ponding water, a probability that a pixel from the set of pixels represents water;
assigning the probability to the pixel;
determining, based on the probability assigned to the pixel and particular precipitation data, from the precipitation data, assigned to the pixel, a class, from one or more classes, to indicate the probability that the pixel represents ponding water after the rainfall;
generating one or more alerts corresponding to the one or more classes determined for the set of pixels.

2. The method of claim 1, wherein a region of the plurality of regions of the field corresponds to a portion of a satellite image provided for the field; further comprising:
initializing a water level for each region of a plurality of regions of the field is performed based on the precipitation data.

3. The method of claim 2, wherein the running a flow simulation over the plurality of pixels of the image data of the field comprises:
initializing a water level for each region of the plurality of regions of the field;
iteratively rebalancing water levels between the plurality of regions;
wherein at each iteration water flows from higher elevation regions to neighboring lower elevation regions based on the elevation data until a stopping condition occurs;
wherein the stopping condition occurs when less than a threshold amount of water has shifted from the higher elevation regions to the neighboring lower elevation regions during a previous iteration;
wherein as water flows from the higher elevation regions to the neighboring lower elevation regions an amount of water is removed by being absorbed by soil based on the soil property data;
after iteratively rebalancing the water levels between the plurality of regions of the field, identifying, using regions of the plurality of regions which still contain water, a set of pixels within the image data that are likely to have ponding water after the rainfall.

4. The method of claim 3, wherein the classifier is logistic regression that has been trained on labeled pixel data derived from one or more images of one or more agricultural fields.

5. The method of claim 4, wherein each pixel of the plurality of pixels comprises one or more light bands; wherein determining the class for each pixel of the plurality of pixels includes:
generating a model, wherein the model includes a graph comprising a set of vertices, each vertex in the set of vertices representing a respective pixel of the plurality of pixels, and a set of edges representing connections between neighboring pixels of the plurality of pixels;
for each vertex in the set of vertices, setting a probability of being ponding water based on the one or more light bands for the pixel represented by the vertex, a probability of representing water for the pixel represented by the vertex, whether the pixel represented by the vertex is in the set of pixels that are likely to have ponding water, and a probability of neighboring pixels of the pixel represented by the vertex being ponding water;
determining the class for each vertex in the set of vertices that maximizes a joint probability over the graph.

6. The method of claim 5, wherein the model is implemented using a Markov Random Field.

7. The method of claim 5, wherein the model increases the probability of being ponding water for a given vertex when the probability of representing water for the pixel represented by the given vertex indicates that the pixel represented by the given vertex likely represents water and the pixel represented by the given vertex is in the set of pixels that are likely to have ponding water.

8. The method of claim 5, further comprising receiving cropland data that indicates which pixels of the plurality of pixels corresponds to cropland, wherein the model classifies the pixel represented by a given vertex as not ponding water if the cropland data indicates that the pixel represented by the given vertex does not correspond to cropland.

9. The method of claim 5, wherein generating the one or more alerts includes sending a message to a user device that specifies ponding water has been detected on the field and one or more locations where the ponding water has been detected based on pixels which have been classified as representing the ponding water.

10. The method of claim 5, wherein generating the one or more alerts includes identifying a shortest route to visit each area on the field corresponding to pixels which have been classified as representing ponding water.

11. A non-transitory computer-readable storage medium storing one or more instructions which, when executed by one or more processors, cause the one or more processors to perform steps comprising:
receiving image data of a field comprising a plurality of pixels, precipitation data for the plurality of pixels of the image data of the field indicating one or more amounts of rainfall over one or more regions of the field, elevation data indicating one or more elevations over the one or more regions of the field, and soil property data indicating one or more properties of soil found across the one or more regions of the field;
running a flow simulation over the plurality of pixels of the image data of the field to identify, using regions of a plurality of regions which still contain water, a set of pixels within the image data that are likely to have ponding water after rainfall;
for each pixel, from the set of pixels within the plurality of pixels:
estimating, using a classifier trained to estimate probabilities that pixels represent ponding water, a probability that a pixel from the set of pixels represents water;
assigning the probability to the pixel;
determining, based on the probability assigned to the pixel and particular precipitation data, from the precipitation data, assigned to the pixel, a class, from one or more classes, to indicate the probability that the pixel represents ponding water after the rainfall;
generating one or more alerts corresponding to the one or more classes determined for the set of pixels.

12. The non-transitory computer-readable storage medium of claim 11, wherein a region of the plurality of regions of the field corresponds to a portion of a satellite image provided for the field; further comprising: initializing a water level for each region of a plurality of regions of the field is performed based on the precipitation data.

13. The non-transitory computer-readable storage medium of claim 12, wherein the running a flow simulation over the plurality of pixels of the image data of the field comprises:
initializing a water level for each region of the plurality of regions of the field;
iteratively rebalancing water levels between the plurality of regions;
wherein at each iteration water flows from higher elevation regions to neighboring lower elevation regions based on the elevation data until a stopping condition occurs;
wherein the stopping condition occurs when less than a threshold amount of water has shifted from the higher elevation regions to the neighboring lower elevation regions during a previous iteration;
wherein as water flows from the higher elevation regions to the neighboring lower elevation regions an amount of water is removed by being absorbed by soil based on the soil property data;
after iteratively rebalancing the water levels between the plurality of regions of the field, identifying, using regions of the plurality of regions which still contain water, a set of pixels within the image data that are likely to have ponding water after the rainfall.

14. The non-transitory computer-readable storage medium of claim 13, wherein the classifier is logistic regression that has been trained on labeled pixel data derived from one or more images of one or more agricultural fields.

15. The non-transitory computer-readable storage medium of claim 14, wherein each pixel of the plurality of pixels comprises one or more light bands; wherein determining the class for each pixel of the plurality of pixels includes:
generating a model, wherein the model includes a graph comprising a set of vertices, each vertex in the set of vertices representing a respective pixel of the plurality of pixels, and a set of edges representing connections between neighboring pixels of the plurality of pixels;
for each vertex in the set of vertices, setting a probability of being ponding water based on the one or more light bands for the pixel represented by the vertex, a probability of representing water for the pixel represented by the vertex, whether the pixel represented by the vertex is in the set of pixels that are likely to have ponding water, and a probability of neighboring pixels of the pixel represented by the vertex being ponding water;
determining the class for each vertex in the set of vertices that maximizes a joint probability over the graph.

16. The non-transitory computer-readable storage medium of claim 15, wherein the model is implemented using a Markov Random Field.

17. The non-transitory computer-readable storage medium of claim 15, wherein the model increases the probability of being ponding water for a given vertex when the probability of representing water for the pixel represented by the given vertex indicates that the pixel represented by the given vertex likely represents water and the pixel represented by the given vertex is in the set of pixels that are likely to have ponding water.

18. The non-transitory computer-readable storage medium of claim 15, storing additional instructions for: receiving cropland data that indicates which pixels of the plurality of pixels corresponds to cropland, wherein the model classifies the pixel represented by a given vertex as not ponding water if the cropland data indicates that the pixel represented by the given vertex does not correspond to cropland.

19. The non-transitory computer-readable storage medium of claim 15, wherein generating the one or more alerts includes sending a message to a user device that specifies ponding water has been detected on the field and one or more locations where the ponding water has been detected based on pixels which have been classified as representing the ponding water.

20. The non-transitory computer-readable storage medium of claim 15, wherein generating the one or more alerts includes identifying a shortest route to visit each area on the field corresponding to pixels which have been classified as representing ponding water.

* * * * *